United States Patent

Kawasaki et al.

Patent Number: 4,462,481
Date of Patent: Jul. 31, 1984

[54] VEHICULAR FLOOR STRUCTURE

[75] Inventors: Katsuyoshi Kawasaki; Jiro Miyata, both of Tokyo, Japan

[73] Assignee: Honda Giken Kogyo Kabushiki Kaisha, Tokyo, Japan

[21] Appl. No.: 410,925

[22] Filed: Aug. 24, 1982

[30] Foreign Application Priority Data

Aug. 26, 1981 [JP] Japan .................................. 56-134680

[51] Int. Cl.³ .......................... B62J 25/00; B62K 5/04
[52] U.S. Cl. .................................. 180/215; 180/210; 180/219
[58] Field of Search ................ 180/210, 215, 216, 217, 180/219, 220, 227, 901.6; 280/87.04 R, 291; 296/1 F, 75; 297/423

[56] References Cited

U.S. PATENT DOCUMENTS

| | | | |
|---|---|---|---|
| 2,136,980 | 11/1938 | Pim | 180/90.6 |
| 2,225,914 | 12/1940 | Lewis et al. | 180/219 |
| 2,439,556 | 4/1948 | Bancroft | 280/87.04 R |
| 2,628,658 | 2/1953 | Ries | 297/423 |
| 2,817,406 | 12/1957 | Brewer | 180/217 |
| 3,369,629 | 2/1968 | Weiss | 180/216 |
| 3,572,757 | 3/1971 | Camps | 280/291 |
| 3,823,058 | 7/1974 | Yamaguchi | 296/1 F |
| 4,356,876 | 11/1982 | Watanabe et al. | 180/210 |

OTHER PUBLICATIONS

Brochure–Cushman Motor Works, Inc., Apr. 26, 1954.

Primary Examiner—David M. Mitchell
Assistant Examiner—Donn McGiehan
Attorney, Agent, or Firm—Irving M. Weiner; Pamela S. Burt; Anthony L. Cupoli

[57] ABSTRACT

A floor structure for small-sized, light vehicles having a low floor, such as motorcycles and three-and four-wheeled vehicles. The floor structure of the small-sized light vehicle comprises a substantially flat floor inclined forwardly downward so as to be relatively higher at the rear end thereof and relatively lower at the front end thereof. The actual longitudinal length of the floor is shortened without extending the substantial longitudinal length thereof, thereby attaining reduction in size and weight of the vehicle. The bending angle of a driver's ankle positioned on the floor when driving the vehicle can be made relatively large, thus permitting a more comfortable driving posture.

2 Claims, 4 Drawing Figures

VEHICULAR FLOOR STRUCTURE

BACKGROUND OF THE INVENTION

1. Field of the Invention

The present invention relates to a floor structure of a small-sized vehicle having a low floor, such as a low-floored motorcycle or a low-floored three-wheeled motor vehicle.

2. Description of Relevant Art

Motorcycles such as motor scooters and three and four-wheeled motor vehicles are provided with a low floor, and heretofore, as shown in FIG. 4 of the accompanying drawings, a floor 51 has been formed horizontally in the longitudinal direction of the vehicle.

As shown in FIG. 4, when a driver M is seated on a seat 52, he positions his foot $M_1$ on the floor 51 when driving the vehicle. In this case, if the angle $\theta$ between foot $M_1$ and leg $M_2$, i.e., the bending angle of ankle $M_3$, is relatively large, a more comfortable posture of the driver is permitted, as is preferable from the standpoint of human engineering. Normally, the driver M attempts to stretch his foot forwardly when he desires to increase the angle $\theta$. However, in providing a vehicle which satisfies such desire of the driver, the floor 51 must be substantially elongated forwardly, thus resulting in an increase in the overall length of the vehicle which leads to correspondingly increased size and weight, contrary to the general demand for reduction in size and weight of the aforesaid types of vehicles.

The present invention effectively overcomes the above-mentioned drawback.

SUMMARY OF THE INVENTION

The present invention provides a floor structure of a small-sized light vehicle wherein the floor is inclined forwardly downward and the actual longitudinal length of the floor is shortened without extending the substantial longitudinal length thereof, and which permits the bending angle of the driver's ankle to be relatively large to thereby ensure a more comfortable and stable driving posture.

A preferred embodiment of the present invention will be described in detail hereinbelow with reference to the accompanying drawings.

DETAILED DESCRIPTION OF PREFERRED EMBODIMENTS

Figure 1:
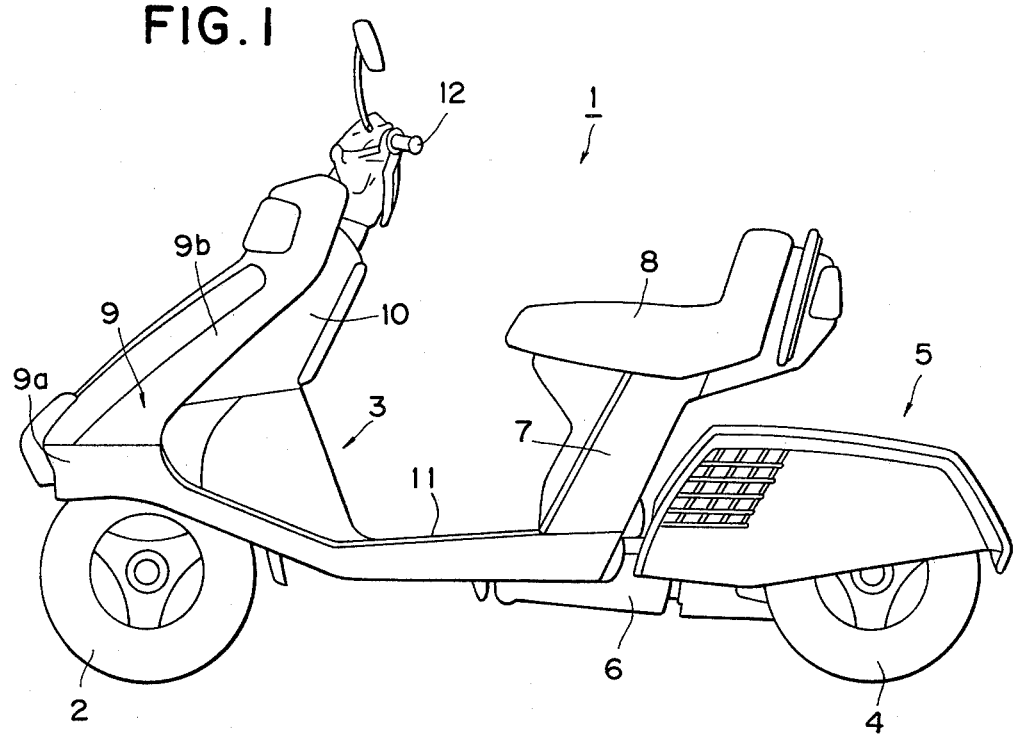
FIG. 1 is a side view of a vehicle provided with a floor structure in accordance with the present invention.
Figure 2:
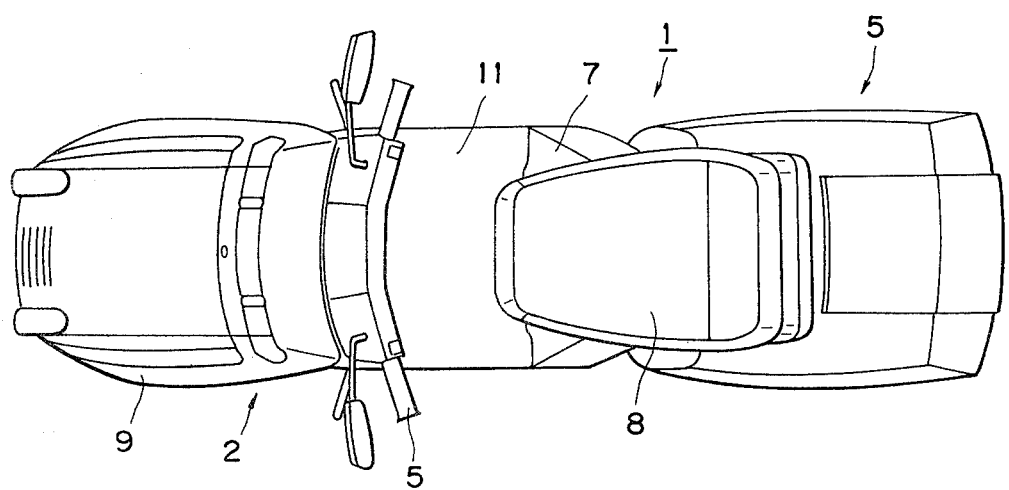
FIG. 2 is a plan view of the vehicle of FIG. 1.
Figure 3:
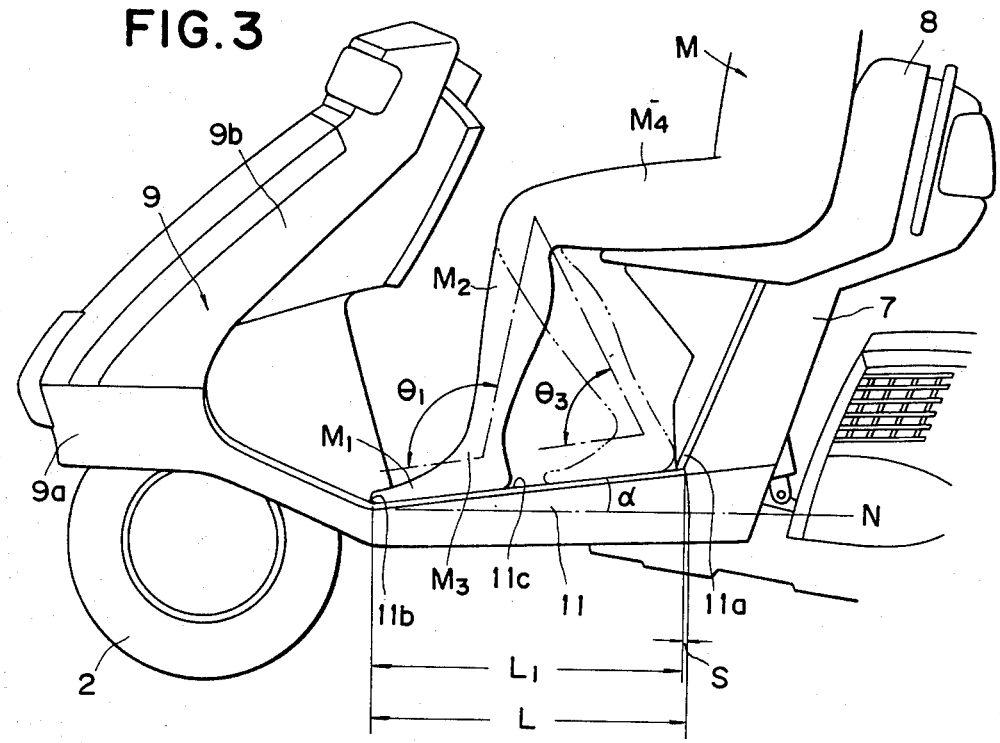
FIG. 3 is an enlarged side view of a principal portion of the vehicle of FIG. 1.

With reference to FIGS. 1-3, there is shown a preferred embodiment of the present invention wherein a three-wheeled motor vehicle 1 includes a low floor. The vehicle 1 comprises a front vehicle body 3 having a single front wheel 2 which serves as a steering wheel, and a rear vehicle body 5 having two rear wheels 4 which serve as driving wheels, the front vehicle body 3 and the rear vehicle body 5 being interconnected through a rolling joint 6 so that the front vehicle body 3 is pivotable to the right and left relative to the rear vehicle body 5 about a horizontal shaft (not shown) of the joint 6.

On the rear portion of the front vehicle body 3 is mounted a seat post 7 which extends upwardly and on which is mounted a driver's seat 8, while at the front portion of the front vehicle body 3 there is provided a leg shield 9 which also serves as a front fender for the front wheel, and a handle post cover 10. A low floor 11 extends from the lower portion of the seat post 7 below the seat 8 to the front portion of the vehicle provided with the handle post cover 10 and the leg shield 9 so that it is substantially flat in both the transverse and longitudinal directions according to the present embodiment. A handlebar 12 is mounted on the handle post cover 10, and in this embodiment the floor extends up to a front fender 9a at the lower portion of the leg shield 9 and is molded of a synthetic resin or the like integrally therewith. The floor 11 is inclined forwardly downward so that the rear end 11a thereof is positioned relatively high and the front end 11b thereof is positioned relatively low. More specifically, with respect to a horizontal line N (FIG. 3) extending from the front end 11b toward the rear, the rear end 11a is disposed thereabove, and a floor surface 11c of the floor 11 is inclined forwardly downward at an angle $\alpha$, which angle may be suitably determined.

Figure 4:
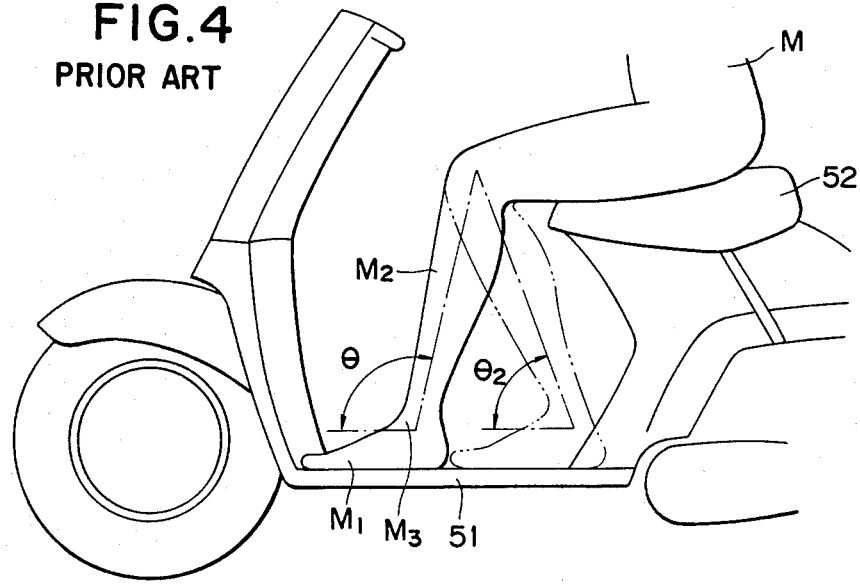
FIG. 4 is a view similar to FIG. 3, showing a conventional floor structure.

In the above-described construction, when the driver M sits on the seat 8 and positions his foot $M_1$ on the floor surface 11c of the floor 11 in an approximately right-angled state between his leg $M_2$ and knee $M_4$, the angle $\theta_1$ of his ankle $M_3$ is increased because the rear heel portion is positioned at a higher level than the front toe portion because the floor 11 is inclined forwardly downward. Consequently, as compared with the conventional floor structure having a flat floor surface, the angle $\theta_1$ of the ankle becomes sufficiently large, thereby permitting a more comfortable driving posture, which is also preferable from the standpoint of driving stability. Further, the bending angle of the leg and knee is decreased, and the bending angle $\theta_3$ (FIG. 3) of the ankle when the driver moves his foot to the rear of the floor surface 11c can be made larger than the ankle bending angle $\theta_2$ (FIG. 4) permitted by the conventional flat floor surface.

In the conventional floor structure, if the ankle angle $\theta_1$ is desired to be relatively large as provided by the present invention, the bending angle of the knee and the leg must be made large and the ankle must be strectched forwardly, and inevitably the floor must be extended forwardly. According to the present invention, however, by virtue of the construction described hereinabove, the bending angle of the ankle can be made large with the same floor length.

In the present invention, moreover, because the floor surface is inclined forwardly downward as shown in FIG. 3, the longitudinal length of the floor can be decreased by the difference S in distance between the effective length L of the floor and the longitudinal dimensional $L_1$ of the vehicle body at this portion, produced on horizontal line N in accordance with the angle of inclination $\alpha$ of the floor, thus permitting further advantageous reduction in size and weight of small-sized light vehicles.

It is to be understood that although in the above-described embodiment the present invention has been described as applied to a three-wheeled motor vehicle, the invention is also applicable to motorcycles and four-wheeled motor vehicles. Further, although in the above-described embodiment the floor is also substantially flat in the transverse direction, the present invention is also applicable to a low floor wherein an intermediate portion in the transverse direction is expanded and both side portions thereof are substantially flat in the longitudinal direction.

Although there have been described what are at present considered to be the preferred embodiments of the invention, it will be understood that the present invention may be embodied in other specific forms without departing from the spirit or essential characteristics thereof. The present embodiments are therefore to be considered in all respects as illustrative, and not restrictive. The scope of the invention is indicated by the appended claims rather than by the foregoing description.

We claim:

1. A floor structure of a small-sized light vehicle having a substantially longitudinally flat low floor mounted between a front wheel and a driver's seat so as to permit a driver to position his feet on said floor, characterized in that:

said floor is inclined forwardly downward; and said floor includes a rear end disposed relatively high at the lower portion of a seat post extending upwardly from the rear portion of said vehicle, and a front end disposed relatively low at the lower portion of a handle post extending upwardly from the front portion of said vehicle, said high rear end and said low front end being interconnected through a substantially flat floor portion.

2. A floor structure according to claim 1, wherein: said low front end of said floor is connected to a front portion which is inclined forwardly upward and which is provided on both sides of the lower portion of said handle post.

* * * * *